United States Patent

[11] 3,624,129

| [72] | Inventor | Mortimer J. Kamley<br>Silver Spring, Md. |
|---|---|---|
| [21] | Appl. No. | 480,258 |
| [22] | Filed | Aug. 13, 1965 |
| [45] | Patented | Nov. 30, 1971 |
| [73] | Assignee | The United States of America as represented by the Secretary of the Navy |

[54] COMPOUNDS CONTAINING A FLUORODINITROMETHYL GROUP
1 Claim, No Drawings

[52] U.S. Cl................................................. 260/471 R,
149/88, 149/105, 260/478, 260/633, 260/646
[51] Int. Cl................................................. C07c 79/46
[50] Field of Search............................................ 260/633,
471, 478, 646, 471 R

[56] References Cited
UNITED STATES PATENTS

| 3,223,725 | 12/1965 | Hill.............................. | 149/88 |
| 3,387,044 | 6/1968 | Grakauskas et al........... | 260/644 |
| 3,446,857 | 5/1969 | Adolph......................... | 260/644 X |

*Primary Examiner*—Leland A. Sebastian
*Attorneys*—R. S. Sciascin and J. A. Cooke CLAIM: 1,7 A compound selected from the group consisting of 2-Fluoro-2,2-Dinitroethanol, 2-Fluoro-2,2-Dinitroethyl-4,4,4-Trinitrobutyrate, 2-Fluoro-2,2,-Dinitroethyl-3,5-Dinitrobenzoate, α-Fluoro-α, α-Dinitrotoluene and αFluoro-α α, 3-Trinitrotoluene. A process for producing a compound containing a fluorodinitromethyl group which comprises reacting the alkali metal salt of the compound selected from the group consisting of 2,2-dinitroethanol and α, α, -dinitrotoluene with perchloryl fluoride to produce the corresponding fluorodinitro derivative.

COMPOUNDS CONTAINING A FLUORODINITROMETHYL GROUP

The invention described herein may be manufactured and used by or for the Government of the United States of America for governmental purposes without the payment of any royalties thereon or therefor.

This invention pertains to novel compounds that are useful as intermediates for forming high explosives and are propellants or explosives per se. More particularly, it pertains to novel compounds containing the fluorodinitromethyl group and a method for their preparation.

In a program to design insensitive high explosive molecules, a theoretical study of the factors which affect impact sensitivity was conducted. From this study, it was concluded that the entropy of activation in the decomposition process is a quantity strongly influencing sensitivity, with the steric conformation about the bond most readily broken being especially important, and it was predicted that compounds containing a fluorodinitromethyl group would comprise a class in which reduced sensitivity to impact and improved thermostability could be achieved without excessive sacrifice of explosive power.

Accordingly, it is an object of this invention to produce novel compounds containing the fluorodinitromethyl group which are useful as explosives and/or propellants.

It is another object to provide compounds that have a reduced sensitivity to impact and improved thermostability.

It is a further object to produce compounds that are useful as intermediates for producing explosives containing the fluorodinitromethyl group.

These and other objects will become more readily apparent from reading the following detailed description of the invention.

The objects of this invention are accomplished by producing the following compounds; 2-Fluoro-2,2-Dinitroethanol, ($\alpha$)-Fluoro-$\alpha$,$\alpha$-Dinitrotoluene, 2-Fluoro-2,2-Dinitroethyl 4,4,4-Trinitrobutyrate, 2-Fluoro-2,2-Dinitroethyl-3,5-Dinitrobenzoate and $\alpha$-Fluoro-$\alpha$,$\alpha$,3-Trinitrotoluene.

Fluorodinitroethanol and fluorodinitrotoluene are produced by fluorinating the alkali metal salts of 2,2-dinitroethanol and $\alpha$,$\alpha$-dinitrotoluene respectively with perchloryl fluoride. The fluorination is generally performed at a temperature between about 0° and 50° C. in a solvent in which the alkali metal salt and perchloryl fluoride are at least partially soluble. The preferred solvents are those in which both reactants have mutually maximal solubilities since the reaction is slow in solvents in which either the dinitro salt or the perchloryl fluoride is insoluble. As examples of solvents that are preferred in this invention, there may be mentioned; dimethylformamide; lower alkanols such as methanol; aqueous lower alkanols; and the like, with dimethylformamide and aqueous methanol giving especially good results.

The alkali metal salt of dinitroethanol (the sodium and potassium salts are preferred) which is used to prepare fluorodinitroethanol is generally prepared by reacting the corresponding alkali metal hydroxide with 2,2-dinitropropanediol in an aqueous lower alkanol at a temperature below about 12° C.

Fluorodinitroethyl trinitrobutyrate is generally prepared by reacting fluorodinitroethanol with 4,4,4-trinitrobutyric acid in an anhydrous sulfuric acid solvent (about 96–130 percent sulfuric acid with percentages over 100 percent representing sulfur trioxide) at a temperature between about room temperature and 100° C.

Fluorodinitroethyl 3,5-dinitrobenzoate is generally prepared by first adding a metal halide catalyst of the type commonly employed in the Friedal-Crafts reaction to fluorodinitroethanol in an organic solvent and subsequently adding 3,5-dinitrobenzoyl chloride to the mixture. The metal halides which are generally used in an amount that varies from 1.5 to 100 percent molar equivalents per mole of dinitrobenzoyl chloride are well known and from among them there may be mentioned; $AlCl_3$, $AlBr_3$, $SbCl_5$, $FeCl_3$, $TeCl_2$, $SnCl_4$, $TiCl_4$, $TeCl_4$, $ZnCl_2$, $BF_3$ and the like. The organic solvent employed may be any solvent that does not interfere with the reaction, with chloroform and carbon tetrachloride being preferred, and carbon disulfide, tetrachloroethane and nitrobenzene also giving good results. The temperature at which the reaction is carried out is not critical, with the reaction being vigorous at temperatures from about 25° to 50° C. and extremely rapid at the reflux temperature.

Fluorotrinitrotoluene is produced by nitrating fluorodinitrotoluene with an equal volume mixture of concentrated nitric acid and fluosulfonic acid. This nitrating agent is generally employed at about 0° C. and it is quite powerful, probably due to the maintenance of anhydrous conditions by the reaction of the fluosulfonic acid with the water produced during nitration.

The following examples illustrate a specific embodiment of the invention but they are not to be considered as limiting the invention in any manner.

GENERAL PROCEDURE

The apparatus generally involved a gas inlet tube and stirrer in a three-neck round bottom flask surmounted by a reflux condenser and with bubble counters fore and aft. After introducing the salt and solvent, most of the air was purged from the system by blowing through a rapid stream of perchloryl fluoride (PF) which was vented to the hood. The rate of input of PF was then cut back until there was a partial vacuum in the system as shown by the liquid level rising in the bubble counter aft, this partial vacuum being due to uptake of the PF by the solvent in forming a saturated solution. Reaction of the salt of the dinitro compound was then evidenced by a rapid input of PF with the partial vacuum being maintained. Generally, where reaction took place the rate was determined by the speed of solution of the gas. Increasing the stirring rate would increase PF uptake, decreasing it would have the opposite effect.

CAUTION

The filtration operations should be well shielded and the filter cakes exhaustively washed with additional solvent before being allowed to air dry since the organic mixtures contain both combustible solvents and explosive organic materials.

EXAMPLE I

To a cooled, stirred solution of 53.0 g. 85 percent potassium hydroxide (0.80 mole) in 140 ml. water and 500 ml. methanol was added dropwise 132.8 g. 2,2-dinitropropandiol-1,3 in 240 ml. methanol, the temperature being kept below 12° C. The precipitated potassium dinitroethanol was separated from solvent through the agency of a filter stick and washed, twice with 250 ml. portions methanol and once with 350 ml. ether, 500 ml. dimethylformamide was then added, the mixture cooled to 15° C. and PF bubbled in at this temperature. The uptake of PF was relatively rapid with the mixture slowly discoloring until, by the time PF uptake was complete, the solution was dark brown. The insoluble material, filtered off and washed with ether (CAUTION) was light yellow, but microscopic examination showed the presence of both white and yellow crystals.

Addition of 2 ml. concentrated sulfuric acid to the brown mother liquor caused a color change to bright orange. Most of the dimethylformamide was then distilled off on the vacuum pump at a temperature below 30° C./1.5 mm. and the residue taken up in 250 ml. ether, washed with three 100 ml. portions water, the combined aqueous washes reextracted with 250 ml. ether and the combined ether phases washed with 100 ml. 3 percent hydrochloric acid. The ether was stripped off and the residual orange oil fractionated in vacuo. After a small forerun the main fraction was taken off at 55°–57° C./1.7 mm. The yield of 2-fluoro-2,2-dinitroethanol thus obtained was 30.7 g. (25 percent of theory). The product was colorless, had a slight nitrous odor and froze at 9°–10°.

EXAMPLE II

A solution of 9.0 g. crude fluorodinitroethanol and 8.92 g. (0.04 mole) trinitrobutyric acid in 30 ml. 10 percent oleum was held at 55° for one hour during which time there was no separation of a second phase. On pouring the solution onto 100 g. ice a yellow oil separated. The mixture was extracted with 200 ml. ether and the ether solution washed successively with 100 ml. water, 200 ml. 1 percent potassium carbonate solution, 100 ml. 2 percent potassium carbonate solution and 100 ml. water, and dried over calcium chloride. Evaporation of the ether left a solid which was taken up in hexane-ether and chilled in the freezer whereupon two crops, totaling 3.52 g. of white needles, m.p. 53.5°–54.0° C. separated. Recrystallization of 1.26 g. of this material from carbon tetrachloride yielded 1.15 g. of an analytical sample of 2-fluoro-2,2-dinitroethyl-4,4,4-trinitrobutyrate as feathery white needles, m.p. 53.5°–54.5° C.

EXAMPLE III

To 4.13 g. (0.0268 mole) of crude fluorodinitroethanol in 25 ml. chloroform and 25 ml. carbon tetrachloride was added 3.35 g. (0.025 mole) anhydrous aluminum chloride. The latter material dissolved completely with vigorous evolution of hydrogen chloride. After slight heating to drive off the last of the hydrogen chloride, a solution of 5.75 g. (0.025 mole) recrystallized 3,5-dinitrobenzoyl chloride in 20 ml. chloroform and 20 ml. carbon tetrachloride was added, and the total heated to reflux for 90 minutes. During this time there separated a gummy brown solid, probably an ester-aluminum chloride complex. The mixture was then allowed to stand for several days during which time clusters of white crystals precipitated over the brown solid.

Decomposition of the complex was effected by adding to the mixture 100 ml. chloroform, 500 ml. ether and 200 ml. 20 percent sulfuric acid and shaking vigorously. The material still insoluble after this treatment, filtered off and vacuum dried, amounted to 4.50 g. and melted at 130°–132° C. The organic phase of the mother liquor, washed with 100 ml. water, dried over anhydrous calcium chloride and concentrated, yielded two crops, totaling 2.31 g. of material melting over the same range (total yield 78 percent of theory). Recrystallization of 5.65 g. of the combined product from ether-benzene afforded 5.15 g. of pure 2-fluoro-2,2-dinitroethyl-3,5-dinitrobenzoate as pale yellow diamond-shaped platlets, m.p. 133.4°–134.2° C. A further recrystallization from benzene did not change the melting point.

EXAMPLE IV

A suspension of 9.7 g. potassium dinitromethylbenzene in 200 ml. methanol was maintained at 25° C. while perchloryl fluoride was slowly bubbled in. During the course of 1½ hour the suspended yellow-orange salt was slowly replaced by a white precipitate as the color of the solution changed to pale chartreuse. Addition of 120 ml. ether and filtration yielded 5.10 g. potassium chlorate. After stripping off the solvent, adding ether, filtering off an additional 0.20 g. potassium chlorate (total 98 percent) and again evaporating the ether in vacuo, there remained as a yellow oil 8.30 g. (95 percent) of crude α-fluoroα, α-dinitrotoluene.

EXAMPLE V

Portionwise addition of 3.3 g. of the crude product of example IV to a stirred solution of 10 ml. 96 percent nitric acid in 10 ml. fluosulfonic acid at 0.50 caused vigorous bubbling, evolution of brown fumes and the eventual formation of a homogeneous pale yellow solution. Pouring over crushed ice gave a yellow oil which on standing slowly solidified. Decantation, trituration with cold methanol and filtration yielded 2.29 g. of a white solid, m.p. 20°–30° C. From the combined decantate and washings was obtained an additional 0.69 g. (total 73 percent). Recrystallization of 2.29 g. from ether-hexane yielded 1.63 g. of α-fluoro-α,α,3 trinitrotoluene, m.p. 31°–32° C. as feathery ivory-colored platelets; a further recrystallization from methanol-water gave an analytical sample of similar m.p.

The fluorodinitroethanol may be used as a propellant for torpedoes or as an intermediate for producing other high energy compounds containing the fluorodinitromethyl group. For example, it can be used to make fluorodinitroethyl formal (FEFO) by reacting it with formaldehyde in the presence of sulfuric acid.

The fluorodinitroethyl trinitrobutyrate and the fluorodinitroethyl 3,5-dinitrobenzoate have a lower impact sensitivity and higher thermo stability than compounds of similar explosive or propellant performance. They are useful as explosives per se, propellants and as energetic plasticizers for energetic polymers in binder propellants.

Fluorodinitrotoluene and fluorotrinitrotoluene are used as high explosives where very low melting points are desired.

Obviously many modifications and variations of the present invention are possible in the light of the above teachings. It is therefore to be understood, that within the scope of the appended claims, the invention may be practised otherwise than as specifically described.

What is claimed is:

1. A compound selected from the group consisting of 2-Fluoro-2,2-Dinitroethanoh, 2-Fluoro-2,2Dinitroethyl-4,4,4-Trinitrobutyrate, 2-Fluoro-2,2-Dinitroethyl-3,5-Dinitrobenzoate, α-Fluoro-α,c-Dinitrotoluene and α-Fluoro-α,α,3-Trinitrotoluene 2. The compound 2-Fluoro-2,2-Dinitroethanol.

3. The compound 2-Fluoro-2,2-Dinitroethyl-4,4,4-Trinitrobutyrate.

4. The compound 2-Fluoro-2,2-Dinitroethyl-3,5-Dinitrobenzoate.

5. The compound α-Fluoro-α,α-Dinitrotoluene.

6. The compound α-Fluoro-α,α,3-Trinitrotoluene.

7. A process for producing a compound containing a fluorodinitromethyl group which comprises reacting the alkali metal salt of the compound selected from the group consisting of 2,2-dinitroethanol and α,α,-dinitrotoluene with perchloryl fluoride to produce the corresponding fluorodinitro derivative.

8. A process for producing 2-fluoro-2,2-dinitroethanol which comprises reacting an alkali metal salt of 2,2-dinitroethanol with perchloryl fluoride.

9. The process of claim 8 wherein said alkali metal salt of 2,2-dinitroethanol is prepared by reacting the corresponding alkali metal hydroxide with 2,2-dinitropropanedial-1,3.

10. The process of claim 8 wherein said alkali metal salt is selected from the group consisting of the sodium and potassium salt of 2,2-dinitroethanol.

11. The process of claim 10 wherein said reaction is performed in an organic solvent selected from the group consisting of lower alkanols, aqueous lower alkanols, and dimethylformamide.

12. The process of claim 11 wherein the reaction is performed at a temperature between about 0° and 50° C.

13. A process for producing α-fluoro-α,α-dinitrotoluene which comprises reacting an alkali metal salt of α,α-dinitrotoluene with perchloryl fluoride.

14. The process of claim 13 further comprising nitrating the α-fluoro-α,-dinitrotoluene with a mixture of concentrated nitric acid and fluosulfonic acid to produce α,α-fluoro-α,α,3-trinitrotoluene.

15. The process of claim 14 wherein said reaction is performed in an organic solvent selected from the group consisting of lower alkanols, aqueous lower alkanols, and dimethylformamide.

16. The method of claim 15 wherein the reaction is performed at a temperature between about 0° and 50° C.

* * * * *